(No Model.)
C. B. ALLAIRE & C. M. JOHNSON.
CASH CARRIER.
No. 286,571.  Patented Oct. 16, 1883.
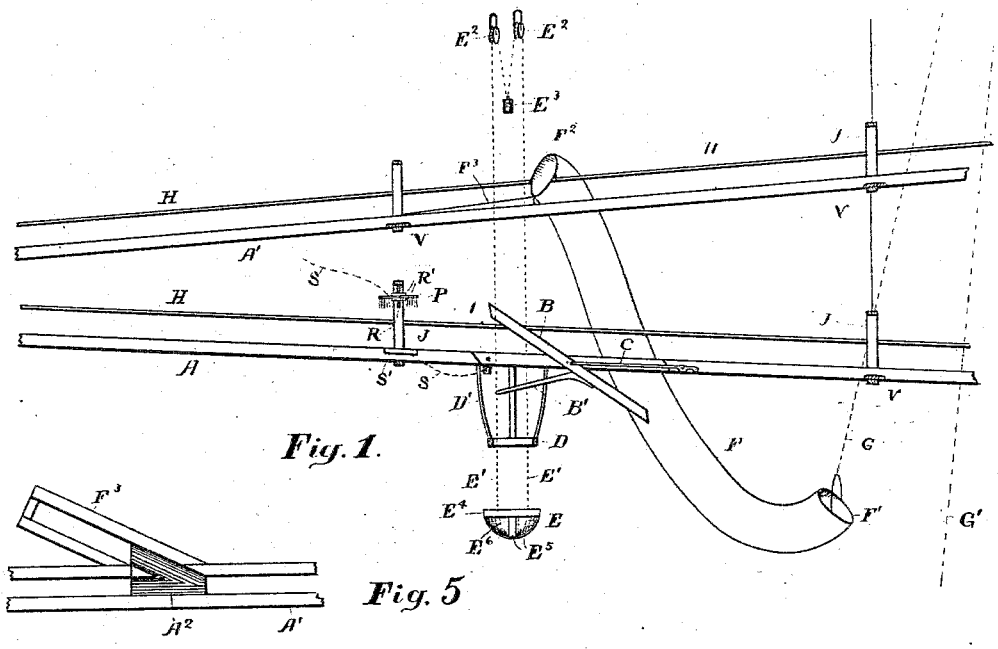
Fig. 1.
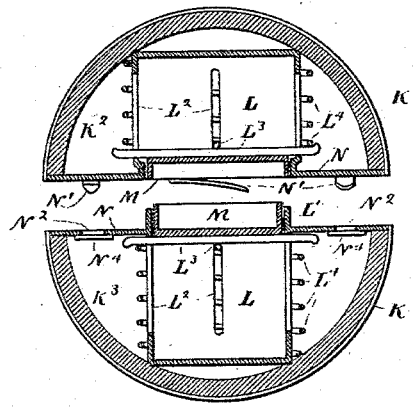
Fig. 5.
Fig. 2.
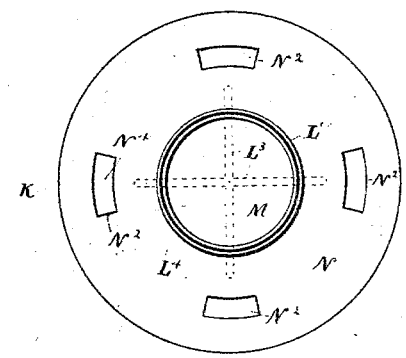
Fig. 3.
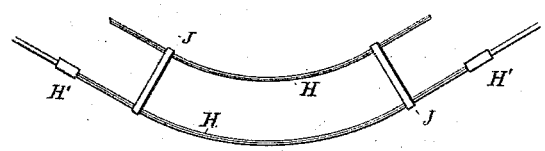
Fig. 4.
Witnesses:
Rich'd A. Goldsbrough.
Nicholas Goldsbrough.
Inventors
Charles B. Allaire,
Charles M. Johnson,
per A. B. Upham,
Their Att'y.

United States Patent Office.

CHARLES B. ALLAIRE AND CHARLES M. JOHNSON, OF PEORIA, ILLINOIS; SAID ALLAIRE ASSIGNOR TO SAID JOHNSON.

CASH-CARRIER.

SPECIFICATION forming part of Letters Patent No. 286,571, dated October 16, 1883.

Application filed August 6, 1883. (No model.)

*To all whom it may concern:*

Be it known that we, CHARLES B. ALLAIRE and CHARLES M. JOHNSON, of Peoria, in the county of Peoria and State of Illinois, have invented an Improved Cash-Carrier; and we do hereby declare that the following is a full, clear, and exact description thereof, reference being had to the annexed drawings, making a part of this specification, in which like letters of reference refer to like parts, and in which—

Figure 1 represents a longitudinal vertical section of the cash-carrier tracks; Fig. 2, section through center of the two hemispheres composing the cash-carrier ball; Fig. 3, plan view of one of the said hemispheres; Fig. 4, plan view of the guard-rails; Fig. 5, detail.

This invention is in that line of cash-carriers for stores in which a hollow ball rolling upon oppositely-inclined tracks is dropped from the lower one of which to a receptacle beneath through a trap automatically opened in the said lower track by an electro-magnet and wires, whose circuit is closed by the passage of said hollow ball.

Our improvements relate especially to a receptacle for the ball, to an elevator for raising the ball from the clerk to the upper track, to the guard-rails for the tracks, to the mode of locking together the two hemispheres of the ball, and to the means for retaining centrally therein the inserted cash.

In the drawings, A A' are the tracks; H H, the guard-rails; E, the ball receptacle; F, the means for elevating the ball from the clerk to the upper track, and K K' the cash-ball.

The track A is provided with the centrally-pivoted trap B, whose lower end is weighted, and from the under side of which projects into the cage D D' an arm, B'. A spring-catch, T, holds the trap B when closed, and an electro-magnet and wires, S, cause said catch to release said trap. To make the brush P accurately adjustable to suit the exact size of its cash-ball, we secure it between two nuts, R', on the screw R. By this means said brush can be raised and lowered until it touches sufficiently the cash-ball rolling beneath it to close the circuit of the otherwise broken wire S. When the circuit is thus closed, the catch T is withdrawn by the magnetizing of its electro-magnet, the trap B opens, and the ball falls through onto the arm B'. The weight and momentum of the falling ball press downward the said arm B', thereby closing the trap B, and it drops into the receptacle E. This receptacle E is suspended by two cords, E' E', passing up over pulleys E², and thence to a weight, E³, heavier than said receptacle E. The ball, however, overcomes the resistance of said weight, and both receptacle and its contents sink to the counter or to the convenient reach of the clerk. When the ball has been removed, the counterpoise-weight E³ carries the receptacle back up to the cage D. In case another ball were on the trap when one following opens it, the said former ball would fall through the space left in the track by the lower end of the open trap. To prevent this we fasten small metal rods C to the track, and have them project toward the pivotal point of the trap between the side bars of the same. Now, if a ball were on the trap as the latter opened, the former would roll along upon the said rods C to the track and continue upon its journey.

To prevent the balls from rolling off the sides of the track we furnish slender wooden rods H H, which run above each track-rail in sockets in the stirrups J. For curved tracks we usually make these guide-bars H each of two thin strips bent to the right curve and glued together. The contiguous ends of the different sections of guide-bars are secured together by means of the metal sleeves H' slipped onto them.

As a means for elevating the balls up onto the track, we have designed a simple stocking, constructed of fabric or leather, fastened at its upper end to a ring, F², secured to a short switch-track, F³, projecting at an acute angle from the track A'. The other end of the said stocking F is secured to a ring, F', and supported by a cord and pulley, G G'. The guide-bar H is severed at the ring F², and the lower portion bent to the outer edge of the ring to allow the ball to roll through said ring onto the switch F³, and from thence to the track. In using this elevator, the ball is put into the upturned end F', and the end G' of the supporting-cord G pulled downward until the end F' of the stocking F has been elevated sufficiently above the track to cause the contained ball to escape from the end F² onto the track.

We construct the ball for carrying the cash as follows: Within the thin metal hemispheres K K' we insert in each a stiffening layer of wood, celluloid, papier-maché, or similar composition. In the hemispheres K K' are cylinders L L, fastened each to the plates N N. One of said cylinders L is smaller in diameter than the other and projects a short distance from the outer surface of the plate N. Within each cylinder L is a shallow cup or flanged disk, M. The object of these flanges to the disks M is to prevent their tipping sidewise in the cylinders L, and thus allow small change or pieces of paper to slip by to the bottom of the cylinders L, and thus clog the same. These cups M M are pressed toward each other by means of the coiled spring L⁴ L⁴ about each cylinder L. The wires L³, soldered or otherwise secured to the under side of each cup M, and sliding in the slots L² through the sides of the said cylinders, receive the pressure from the springs L⁴ and impart it to the cups L. The object of this elastic movement of the cups M M is that the coins placed therein shall be held at the center of the ball, whether there be much or little. By having the springs L⁴ on the outside of the cylinders L, the cups M are pressed together evenly, and more space is left between the said cups and the bottoms of the cylinders to allow the cups to make room for a larger quantity of cash. The means for locking these hemispheres together consist of two or more springs N', fastened upon the plate N of one hemisphere. In the other plate N are slots N² to correspond with said springs. Strips N⁴, fastened at one end or side of each to the inside of the plate N over the slots N², prevent paper, dust, or small change from getting through the said slots into the inside of the hemisphere. In using this cash-ball the cash is placed into the cup M of the cylinder K, and the other hemisphere placed down over it. The projecting cylinder L entering the other, the two cylinders are held concentric together. Turning the upper cylinder, K', in the direction of the hands of a watch, the springs N' enter the slots N², and, being pressed firmly home, hold, by their elasticity, the two hemispheres together. A slight reverse movement of the same unfastens them and allows the said hemispheres to separate.

In Fig. 5 is shown our mode of securing the short switch-track F³ to the main track A'. A² is a block of wood or other material fastened into the main track, one rail of which is cut away to receive it. To the outside of this block the switch F³ is secured, and the upper surface of this block is grooved in line with the main track, and also the switch-track. This grooving is just deep enough to allow the ball to pass thereon from the tracks without disturbance. The object of this block A² and its grooves is that the side rail of the main track may be cut through, and yet the passage of a ball thereover shall not be in the least impeded; and also to give a free inlet from the switch-track F³ to the main track A'.

To prevent the track-rails from acting as sounding-boards and re-enforcing the noise which the balls rolling thereon might produce, we insert between each rail and its supporting-stirrup a plate of rubber or other non-sonorous body. This deadens the vibrations of the track, and therefore silences all sound connected with the passage of the cash-balls upon the tracks. These plates V also prevent the sustaining-wires of the stirrups from sharing in the vibrations which both they and the tracks would otherwise share.

Our cage D consists of the ring D and vertical strips D', fastened thereto and to the track A. This ring D is small enough to fit easily into the receptacle E.

In constructing the receptacle E we make a light metal frame, and line it on the inside with felt or some other similar material. The said frame consists of a horizontal ring and two or more semicircular strips fastened at their ends to said ring, and also secured together at their point of intersection.

What we claim as our invention, and for which we desire Letters Patent, is as follows, to wit:

1. In combination with a track and a vertically-oscillatory trap therein, a receptacle, E, having suspending-cords E', pulleys E², and counterpoise-weight E³, substantially as and for the purpose specified.

2. The track A, trap B, and cage D D', in combination with the receptacle E, cords E', pulleys E², and weight E³, or equivalent counterpoising device, substantially as and for the purpose herein described.

3. The receptacle E, consisting of ring E⁴, semicircular strips E⁵, and lining E⁶, in combination with means whereby it shall automatically return to its former position after its depressing contents are removed.

4. A tube formed of some flexible material, one end of which is fastened at a desired point of delivery, and having means whereby its other end may be raised sufficiently to impel a ball inserted into the movable end through said tube and out at its fixed end, substantially as set forth.

5. The stocking F, formed of fabric or some similar material, the rings F' F², and cord G, in combination with the track of a cash-carrier, substantially as and for the purpose specified.

6. In combination with the tracks A A' of a cash-carrier system, the wooden guard-rails H H, and the stirrups J, having suitable sockets for receiving said rails, substantially as and for the purpose described.

7. The guard-rails H, formed of two thin strips of wood cemented together to form and maintain a curve, in combination with the stirrups J, having sockets J', and the thimbles H', as and for the purpose set forth.

8. In combination with the track A and the centrally-pivoted trap B, the small rods C, fastened to said track and projecting in between the side bars of said trap, substantially as and for the purpose specified.

9. The track A' and switch F³, in combination with the grooved block A², as and for the purpose set forth.

10. In combination with the track-rails and the supporting-stirrups of the same in a cash-carrier system, a plate of rubber or similar non-sonorous body, V, inserted between the contiguous surfaces of said track and stirrups, as and for the purpose herein described.

11. The two hemispheres K K', having openings N² in the plate N of one and springs N' fast to the plate N of the other, substantially as and for the purpose specified.

12. The hemispheres K K', having cylinders L L, in combination with the cups or flanged disks M M and coiled springs L⁴, for the purpose set forth.

13. The hemispheres K K', cylinders L L, and springs L⁴ L⁴, coiled about said cylinders L, in combination with the cups M M and the cross-wires L³, substantially as and for the purpose herein set forth.

14. The thin metal hemisphere K, having stiffening-layer K³, the plate N, having openings N² and spring-coverings N⁴ therefor, the projecting cylinder L, spring L⁴, and cup M, in combination with a similar hemisphere, K', whose plate N is provided with the springs N', substantially as and for the purpose specified.

15. In combination with a screw, R, rigidly secured above the track A, the brush P, having circuit-wire S, the set-nuts R', electro-conductive plate S', and circuit-wire S, as specified.

In testimony that we claim the foregoing invention we have hereunto set our hands this 1st day of August, A. D. 1883.

CHARLES B. ALLAIRE.
CHARLES M. JOHNSON.

Witnesses:
EDWARD R. BATES,
JENNIE L. MAYNE.